United States Patent [19]

Sterzel

[11] Patent Number: 5,498,390
[45] Date of Patent: Mar. 12, 1996

[54] PRODUCTION OF HOLLOW ARTICLES FROM THERMOPLASTICS

[75] Inventor: Hans-Josef Sterzel, Dannstadt-Schauernheim, Germany

[73] Assignee: BASF Aktiengesellschaft, Ludwigshafen, Germany

[21] Appl. No.: 179,697

[22] Filed: Jan. 11, 1994

[30] Foreign Application Priority Data

Jan. 13, 1993 [DE] Germany ............... 43 00 597.7

[51] Int. Cl.⁶ ................ B29C 49/12; B29C 49/64
[52] U.S. Cl. ................ 264/532; 264/528; 425/526
[58] Field of Search ............... 264/528, 532, 264/523, 526, 529, 530; 425/526

[56] References Cited

U.S. PATENT DOCUMENTS

| | | | |
|---|---|---|---|
| 2,834,154 | 5/1958 | Koob | 49/9 |
| 3,246,062 | 4/1966 | Scott et al. | 264/98 |
| 3,694,424 | 9/1972 | Hunkar et al. | 264/528 |
| 3,882,213 | 5/1975 | Uhlig | 264/532 |
| 4,367,187 | 1/1983 | Fokushima et al. | 264/528 |
| 4,421,711 | 12/1983 | Bonnebat et al. | 264/529 |
| 4,519,975 | 5/1985 | Neumann . | |
| 4,649,004 | 3/1987 | Nohara et al. . | |
| 4,741,936 | 5/1988 | Nohara et al. . | |

FOREIGN PATENT DOCUMENTS

| | | | |
|---|---|---|---|
| 434276 | 6/1991 | European Pat. Off. . | |
| 1604544 | 11/1966 | Germany . | |
| 62-021520 | 1/1987 | Japan | 264/528 |
| 1485720 | 9/1977 | United Kingdom | 264/528 |

OTHER PUBLICATIONS

*Database WPI,* Week 8426, Derwent Publications, Ltd., AN 84–161339 (English abstract of JP–A 59 085 722).
Rosato et al., *Blow Molding Handbook,* 1989, p. 303.

*Primary Examiner*—Catherine Timm
*Attorney, Agent, or Firm*—Keil & Weinkauf

[57] ABSTRACT

For the production of hollow articles from thermoplastics, such as wide-necked vessels, bottles and the like, an amorphous parison is injection-molded, warmed to a temperature above the glass transition temperature of the plastic, placed in a mold and stretch blow molded to give a hollow article. During the stretch blow molding, a liquid coolant, preferably water, is metered into the mold in such an amount that the temperature of the parison remains approximately constant or increases only insignificantly.

3 Claims, No Drawings

PRODUCTION OF HOLLOW ARTICLES FROM THERMOPLASTICS

The present invention relates to a process for the production of hollow articles from thermoplastics.

It is known for hollow articles, for example beakers and cans, whose neck diameter is smaller than the maximum diameter, wide-necked vessels and bottles up to a capacity of about 2 liters to be produced by stretch blow molding. Preferred materials are styrene polymers and polyethylene terephthalates. In this process, an amorphous parison having a wall thickness of from 3 to 4 mm is first produced by injection molding. The local wall thicknesses in the parison are determined by the injection mold, while those in the blow molding can be modified by the local temperature in the parison. Inflation can be carried out immediately after injection molding or after corresponding conditioning and stretching operations. In general, the parison is warmed to from about 20° to about 80° C. above the glass transition temperature of the plastic, placed in a mold and converted into a hollow article by stretch blow molding.

In the stretch blow molding of parisons made from polyethylene terephthalate, it has been found that, if the polyethylene terephthalate is stretched more at one point, the rigidity increases overproportionally there compared with the environment due to orientation and crystallization phenomena, so that the more easily stretchable environment is stretched to a greater extent after an infinitesimally short time, and compensation thus takes place. The enthalpy of crystallization which is liberated cannot be dissipated quickly enough from the environment and results in an even increase in the material temperature during stretching as a function of the crystalline content achieved in each case. For an enthalpy of melting of about 120 J/g and a specific heat of 1.55 J/g.K, this corresponds to an increase in temperature by 8 degrees per 10% increase in the degree of crystallinity. For the 70% final crystallinity usually achieved, the increase in temperature is thus 56 degrees.

Uniform inflation thus also requires a slight dependence of the rigidity on the temperature, otherwise the increase in temperature causes a rapid drop in melt rigidity at a point of locally increased stretching, resulting in overstretching at this point.

However, this self-regulation mechanism does not occur in all polymers which can be converted into amorphous parisons, in particular not in the case of copolyesters, copolyamides, aliphatic polyesters, such as polylactides, or polyolefins, such as poly-3-methyl-1-butene or poly-4-methyl-1-pentene. These polymers have glass transition temperatures of below 70° C. and crystallite melting points of above 120° C., and their amorphous parisons should therefore be readily convertible into hollow articles by stretch blow molding at temperatures of around 100° C. However, inflation of these parisons is frequently accompanied by flaws due to local overstretching caused by the heat of crystallization which is liberated and the associated reduction in rigidity.

It is an object of the present invention to provide a process of the generic type indicated at the outset which also allows the processing of polymers whose rigidity is considerably reduced during inflation as a consequence of temperature increase.

We have found that this object is achieved by the measure proposed herein.

According to the invention, a liquid coolant, preferably sterilized demineralized water, is metered into the blow mold during stretch blow molding in an amount just sufficient so that the heat liberated by crystallization is compensated by the heat of evaporation of the coolant. The temperature of the parison is only increased to an insignificant extent, or not at all, during the blow molding. To this end, the blowing mandrel contains an additional bore with a nozzle for the coolant. The latter is metered in via an adjustable pump in an amount of 0.3–5 ml ±0.02 ml. The preformulation is warmed to from about 20° to about 80° C. above the glass transition temperature of the plastic. The coolant is expediently metered into the mold at the beginning of the blowing operation; in a preferred embodiment of the process, it is introduced together with the blowing gas and is thus metered in uniformly over the entire inflation operation. In order to avoid surface structures due to excessively large liquid drops, the coolant is preferably atomized in the blowing air stream by means of an ultrasound atomizer, which may give drop sizes of from 10 to 30 μm, which form a coherent thin film on the internal surface of the parison. The amount of coolant can easily be determined by simple preliminary experiments. For water as coolant, the amount is given to an approximation by the following equation:

$m_{H2O}$-(mass of the hollow article×heat of crystallization per gram of polymer×crystalline content at the end of the blowing process/heat of evaporation for one gram of water).

The coolant vapor which forms in the mold is vented at the end of the blowing operation together with the compressed blowing gas. Subsequent drying of the hollow article is unnecessary.

The novel process gives hollow articles having very good mechanical properties, low permeation by water, aroma substances and gases, and high surface gloss.

EXAMPLE 1

(Comparative Example)

Poly-L-lactide having an inherent viscosity of 1.59 (100 ml/g), measured as a 0.1% solution in chloroform at 25° C., was dried for 10 hours at 120° C. at below 10 mbar and then melted at 205° C. under argon as protective gas in an injection-molding machine, and the melt was injected into a mold held at 20° C.

Cylindrical parisons were produced, with a screw thread and collar about 25 mm in length, a spherical base, external diameter about 26 mm, internal diameter about 19.4 mm, wall thickness 3.3 mm, inflatable length about 120 mm, total weight 45.6 g.

Due to the low mold temperature, the parisons were amorphous. For stretch blow molding, the parisons were warmed in various experiments to from 80° to 140° C. by means of infra-red lamps while being rotated about the longitudinal axis; after a temperature equalization time of from 5 to 10 seconds, the warmed parisons were placed in a mold and subjected to stretch blow molding.

The stretching was carried out inhomogeneously, giving incompletely inflated bottles. Depending on the temperature conditions, the parison burst, during inflation, at various points with overstretching of the wall thicknesses of 0.035 mm. The parts stretched normally had rigidities (modulus of elasticity in tension) of 5.500 N/mm$^2$ at room temperature for wall thicknesses of 0.25 mm.

EXAMPLE 2

(According to the Invention)

The parisons from Example 1 were heated to 100° C. by means of infra-red lamps. After introduction into the mold, the parisons were inflated, with 1.0 g of water being sprayed into the parison together with the blowing air.

Flaw-free bottles of high surface gloss and moduli of elasticity of 5.500 N/mm$^2$ on the jacket, stretched to 0.25 mm, were obtained.

We claim:

1. In a process for the production of hollow articles by (a) forming of an amorphous parison by the injection molding of a thermoplastic material into a first mold, which is cooled, and (b) removing the parison from said first mold, heating the parison to a temperature of about 20° to about 80° above the glass transition temperature of the thermoplastic, and placing it into a second mold where it is stretch blow molded to produce the hollow article, the improvement wherein during the stretch blowing a liquid coolant is metered in along with the blowing gas such that the temperature of the parison remains approximately constant such that the heat liberated by crystallization is compensated by the heat of evaporation.

2. The process of claim 1, wherein the coolant is atomized in the blowing gas stream by means of an ultrasound atomizer giving drop sizes of from 10 to 30 μm.

3. A process as claimed in claim 1, wherein the liquid coolant used is water.

* * * * *